(12) United States Patent
Arulf et al.

(10) Patent No.: US 10,654,594 B2
(45) Date of Patent: May 19, 2020

(54) PAYLOAD DISPENSER

(71) Applicant: RUAG SPACE AB, Gothenburg (SE)

(72) Inventors: Orjan Arulf, Linkoping (SE); Johan Ohlin, Rimforsa (SE)

(73) Assignee: RUAG SPACE AB, Gothenburg (SE)

( * ) Notice: Subject to any disclaimer, the term of this patent is extended or adjusted under 35 U.S.C. 154(b) by 115 days.

(21) Appl. No.: 15/967,170

(22) Filed: Apr. 30, 2018

(65) Prior Publication Data

US 2018/0327119 A1 Nov. 15, 2018

Related U.S. Application Data

(63) Continuation of application No. PCT/SE2017/050472, filed on May 10, 2017.

(51) Int. Cl.
*B64G 1/64* (2006.01)
*B64G 1/00* (2006.01)

(52) U.S. Cl.
CPC ............ *B64G 1/641* (2013.01); *B64G 1/002* (2013.01); *B64G 1/645* (2013.01); *B64G 2001/643* (2013.01)

(58) Field of Classification Search
CPC ............................ B64G 1/641; B64G 2001/643
See application file for complete search history.

(56) References Cited

U.S. PATENT DOCUMENTS

| | | | |
|---|---|---|---|
| 5,411,226 A * | 5/1995 | Jones | B64G 1/1085 244/173.3 |
| 5,613,653 A * | 3/1997 | Bombled | B64G 1/641 244/173.1 |
| 5,884,866 A | 3/1999 | Steinmeyer et al. | |
| 6,138,951 A * | 10/2000 | Budris | B64G 1/002 102/393 |
| 6,276,639 B1 | 8/2001 | Hornung et al. | |
| 6,557,802 B2 * | 5/2003 | Kroeker | B64G 1/002 244/173.3 |
| 9,463,882 B1 | 10/2016 | Field et al. | |
| 2007/0063107 A1 | 3/2007 | Mueller et al. | |
| 2014/0131521 A1 | 5/2014 | Apland et al. | |
| 2015/0232205 A1* | 8/2015 | Lively | B64G 1/002 244/2 |
| 2016/0304222 A1 | 10/2016 | Fernandez et al. | |
| 2016/0368625 A1 | 12/2016 | Field et al. | |

OTHER PUBLICATIONS

International Search Report and Written Opinion for PCT/SE2017/050472, dated Feb. 9, 2018.

\* cited by examiner

*Primary Examiner* — Richard G Davis
(74) *Attorney, Agent, or Firm* — Brinks Gilson & Lione; John C. Freeman

(57) ABSTRACT

A payload dispenser for a launch vehicle includes a plurality of panels. At least one panel includes a payload mounted onto the panel. The panels are attachable to each other to thereby form a self-supporting dispenser.

14 Claims, 8 Drawing Sheets

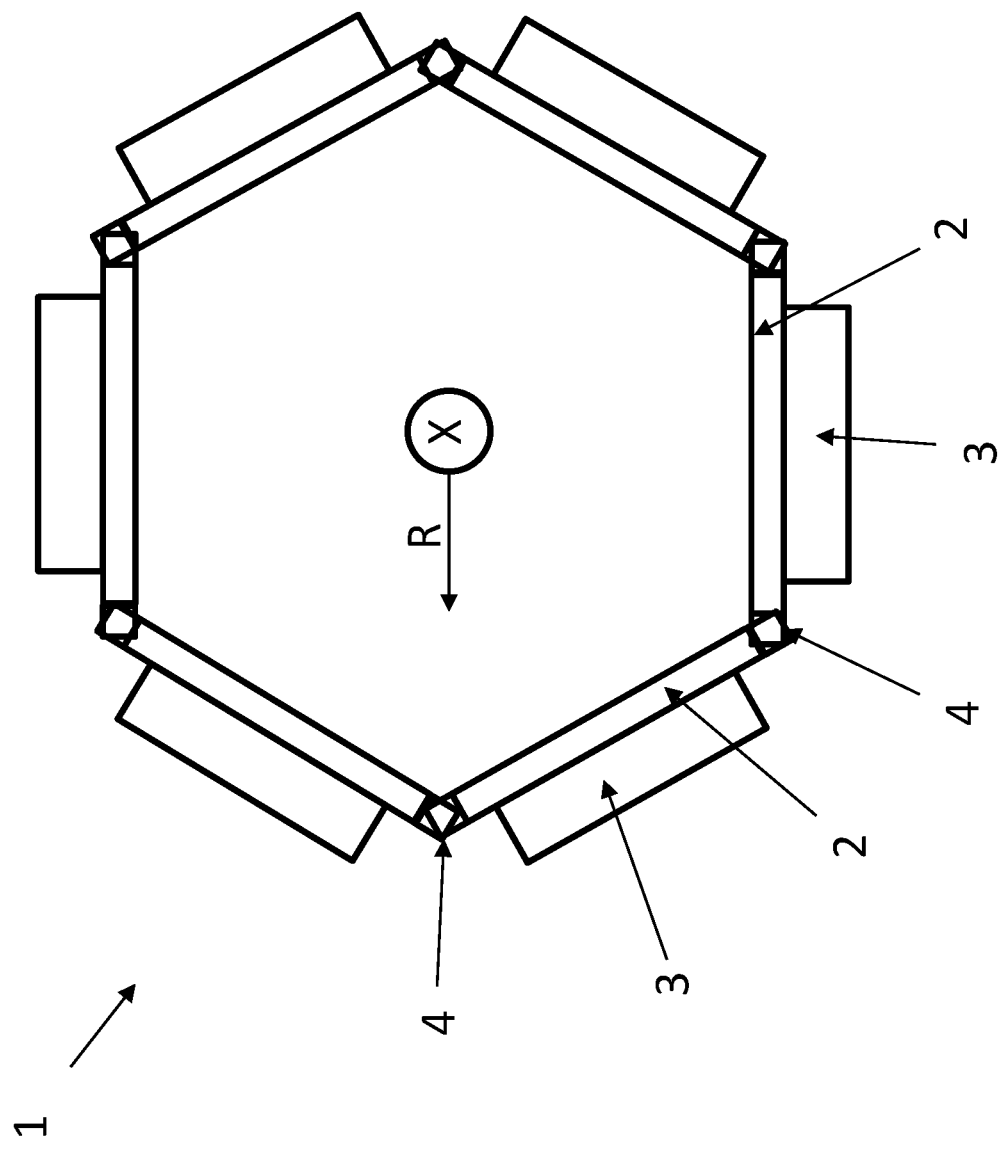

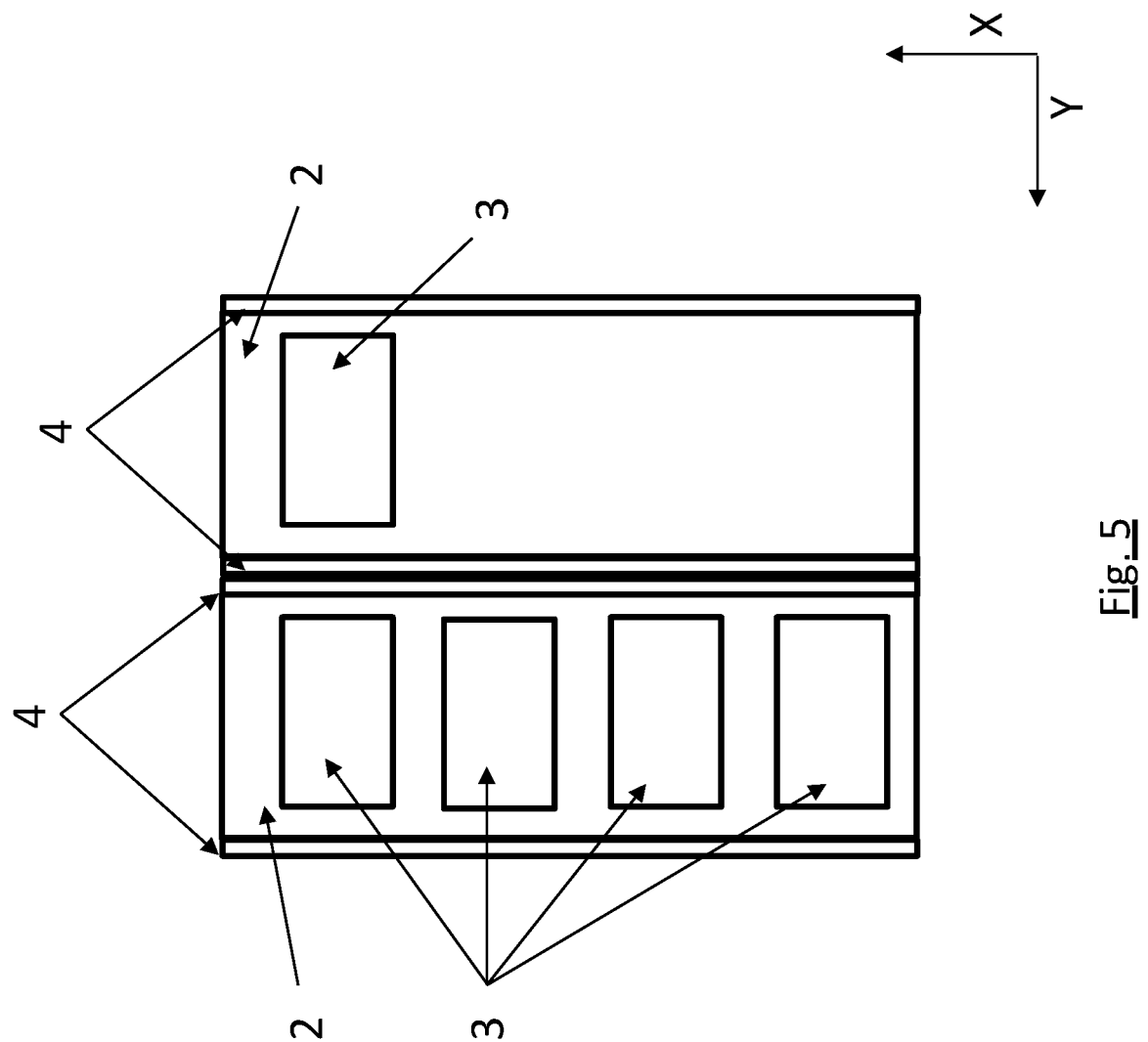

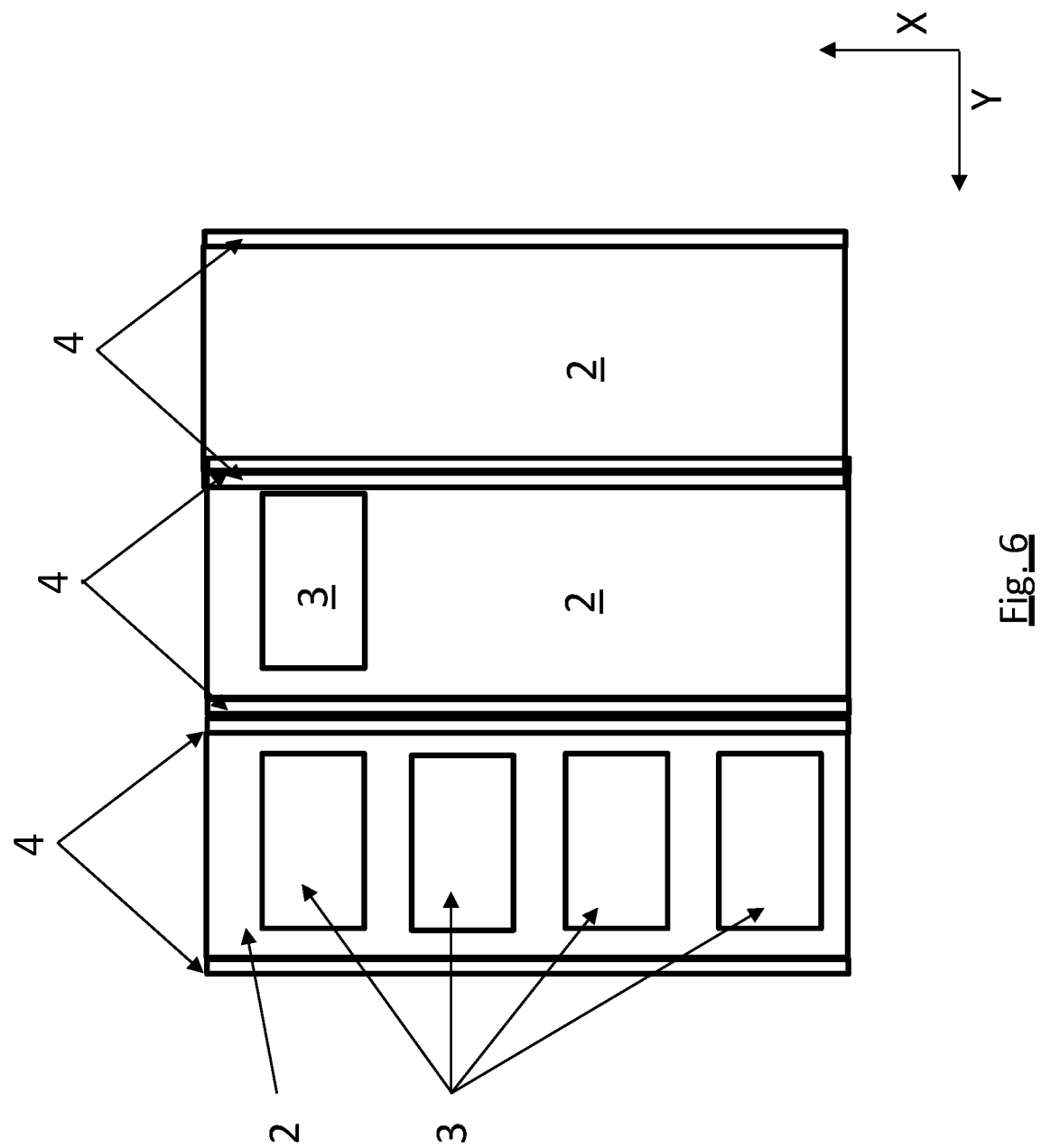

PAYLOAD DISPENSER

RELATED APPLICATIONS

This application is a continuation under 35 U.S.C. §§ 120 and 365(c) of International Application No. PCT/SE2017/050472, filed May 10, 2017, the contents of which are hereby incorporated by references in their entirety.

TECHNICAL FIELD

The present disclosure relates to a payload dispenser for a launch vehicle comprising a panel and a payload. The disclosure further relates to a method for assembly of the payload dispenser.

BACKGROUND

The preparation and integration of multiple satellites onto a dispenser/launcher is traditionally an intricate and time consuming task. Typically the amount of time needed to integrate one satellite onto the launcher is many hours. For a large dispenser intended for launch of constellation satellites the number of satellites in a launch can be up to and above 100. This amounts to approximately 10 weeks integration time doing it the classical way.

There is thus a need for an improved payload dispenser and method for the same that improves the integration time.

SUMMARY

An object of the present disclosure is to provide an improved payload dispenser and improved method for assembly of the dispenser. This object is at least partly achieved by the features of the independent claims. The dependent claims contain further development of the payload dispenser.

The disclosed payload dispenser further eliminates the need for a plurality of support structures which in turn relocates and/or removes structural mass from e.g. interface structures on the dispenser. Yet further advantages are reduced number of parts and simplified tools required, which allows for shorter lead times and lower tooling costs.

The disclosure relates to a payload dispenser for a launch vehicle. The dispenser comprises a plurality of panels and at least one panel comprises at least one payload mounted onto the panel. The panels are attachable to each other forming a self-supporting dispenser. It should be noted that the assembled dispenser is a primary load bearing and self-supported structure. Here, primary load bearing refers to that the dispenser transfers the loads from the Launch Vehicle to the payload(s). The primary load carrying structure is designed as a facetted tube with detachable sides and the number of panels can be anything from three to more than ten.

According to one example, each panel comprises at least one payload. According to one example, at least one panel comprises a plurality of payloads.

Hence, the number of payloads per panel can vary between zero and a plurality. However, the dispenser always comprises at least one payload. The payload is advantageously positioned to balance the dispenser. Hence, the payload can be arranged symmetrically about the dispenser. For example, the dispenser comprises two opposing payloads positioned on opposing panels. Hence, one payload is positioned on one panel and the other is positioned on an opposing panel. The panels positioned between the payload mounted panels can then be free from payload. According to another example, all panels comprise at least one payload. If balance is part of the design parameter normal rules of symmetry apply for balancing the dispenser should the dispenser without the payload be balanced in itself. If the dispenser without the payload is not balanced, then the position of the payload can be used to create balance. Here, balance could refer to rotation and/or gravity symmetry about a fictive central longitudinal axis about which the dispenser is built.

The payload is advantageously mounted onto the panel before assembly of the dispenser. The payload is typically attached to an outside of the panel via payload mounting and separation means positioned in openings running from the outside and through the panel to a backsheet of the panel. The mounting and separation means are attached to the payload at one end and secured to the panel via securing means on the other end. One advantage with attaching the payload on the panels before assembly of the panels to each other is that the free panel grants easy access to the payload mounting and separation means compared to should the payload be attached to an already assembled dispenser structure. Furthermore, in prior art the payload is attached to a support structure that is attached to a dispenser body. With reference to that prior art, the panels gives the advantage that it grants access to the backside of the panels also when assembled into the dispenser without further tooling of a dispenser body. A further advantage is that the payload dispenser can be transported in sections, i.e. the panels, instead of in one very large and bulky entity. Hence, the panel is in itself self-supported such that it can be transported with the payload attached to it.

According to one example, the payload is a satellite. One or more panels may also comprise different or additional payloads such as cables, energy sources and communication devices.

The payload dispenser has an extension in a longitudinal direction and in a radial direction with reference to cylindrical coordinates. The reference system is chosen to simplify the description of the payload dispenser and should not be seen as limiting per se. The Longitudinal direction is typically the height direction and the radial direction is perpendicular to the longitudinal direction. With reference to the chosen reference system, the payload dispenser is delimited in the radial direction by the panels forming an envelope surface. Each panel comprises longitudinal attachment means in the longitudinal direction being attachable to neighboring panels. Hence, the panels are attachable to each other in an interface running in the longitudinal direction.

The attachment means are arranged to lock in position with relation to each other to allow for the self-supporting dispenser. The attachment means are arranged to be connected to each other during dispenser assembly and are arranged to fixate the panels in relation to each other. Here, lock in position and fixate refers to that the attachment means engage each other such that when the panels are positioned at a predetermined angle to each other, the panels cannot be hingeably rotated with relation to each other nor can they be moved in the longitudinal direction. Furthermore, today there exist a number of demands regarding the performance of the dispenser assembly, for example stiffness and the attachment means are arranged to meet such demands.

According to one example, the attachment means are arranged to allow for disassembly of parts of or the entire payload dispenser. This has the advantage that should a payload be faulty, the panel onto which the faulty payload is attached can be removed and exchanged to another panel instead of the more complicated task of removing and exchanging the payload itself as discussed above.

As mentioned before, the payload dispenser is delimited in the radial direction by the panels when assembled. Furthermore, the panels themselves can be described as being delimited in the longitudinal direction and a lateral direction being perpendicular to the longitudinal direction. When the dispenser is assembled by the panels the attachment means lie in the envelope surface.

According to one example, at least one or each panel has an unbroken extension in the longitudinal direction. Here, unbroken refers to that the panel is not assembled by parts in the longitudinal direction. However, the panel can be made from a single layer or a combination of layers in the thickness direction. Here, the thickness direction refers to the radial direction when the panels are assembled into the dispenser.

According to one example, at least one panel comprises panel portions attached to each other forming the panel. According to one example, the panel portions are assembled in the longitudinal direction, i.e. the height direction. Here the at least one of the panel portions comprises laterally extending attachment means for assembly of the panel along the lateral direction being perpendicular to the height direction. The panel portions are also assembled in the longitudinal direction via the longitudinally extending attachment means forming the dispenser. Also here, the panel portions and thus the panels can be made from a single layer or a combination of layers in the thickness direction.

The panel portions are thus fixedly attached to each other via the longitudinal attachment means and via the lateral attachment means when applicable. The attachment means are arranged to lock in position with relation to each other to allow for the self-supporting dispenser according to what have been described above.

The disclosure also relates to a method for assembly of a payload dispenser according to any one of the preceding claims, wherein the method comprises the steps of
   a. mounting at least one payload onto one panel,
   b. attaching the panels to each other via longitudinally extending attachment means,
   c. locking the attachment means in position to hinder movement between the panels, and if applicable the panel portions, forming a self-supporting dispenser.

According to one example, the method comprises the step of mounting at least one payload onto each panel before assembly of the panels.

According to one example, the method comprises the step of attaching panel portions to each other via laterally extending attachment means.

As described above, the panels can be made from panel portions and the panel portions are connected to each other via laterally extending attachment means. The panels are attached to each other via the longitudinally extending attachment means. According to one example, the panel portions are attached to each other via the laterally extending attachment means before the panels are attached to each other via the longitudinally extending attachment means. According to another example, panel portions are attached to each other via longitudinally extending attachment means forming dispenser portions and the panel portions are then attached to each other via the laterally extending attachment means. In the latter example the dispenser can thus be built in sections, i.e. the dispenser portions, where the dispenser portions are positioned on top of each other in the height direction, i.e. the longitudinal direction.

The number of panels in the payload dispenser can be chosen dependent on design of the dispenser. The design can be limited by e.g. size and/or payload mass, launch vehicle configuration or other design requirements.

It should be noted that seen from the side, i.e. in the radial direction, and in a two-dimensional projection, the dispenser can have an essentially cylindrical form, a conical shape or a combination thereof. Seen from above, i.e. in the longitudinal direction, the number of panels gives a polygon shape with at least three sides. The panels can be flat or curved and the panels can have an even thickness or the thickness can vary dependent on design of the dispenser.

Each panel is designed with considerable out of plane stiffness, typically a sandwich or possibly a grid plate. On this plate interfaces to separation interfaces will be integrated, typically by introducing inserts in a sandwich or just holes or threads in a machined grid plate. As the primary sizing of the panel is driven by the need for a stiff behavior of the integrated facetted tube together with sufficient out of plane stiffness for the satellite I/F points these parameters are controlled by sandwich height and panel sheet stiffness.

The design of the panels allows for integration into the final dispenser with minimal access to the external side of the panel where maximum volume is allocated to the payload (satellites).

It is preferred to design the panel attachment means so a bending moment can be transferred to conserve the bending stiffness of the panels in circumferential direction, thus avoiding local eigenmodes that can arise due to the dynamic launch environment.

Advantages

The concept makes use of the structural mass in an effective way. All mass is contributing with stiffness both during integration and during launch. Hence the concept is mass effective.

The dispenser is easy transportable in flat packages before integration, i.e. assembly of the dispenser.

The structural design becomes modular; a panel can just be replaced in case of damages. Minimizes risk.

The tooling for the dispenser is much simplified no layup tool with several months lead time is needed, simple flat panels is sufficient. Saves time and cost.

No machining of an oversized central cylinder is required, simplifies logistics and saves machining costs No big and expensive assembly rig is needed. The interface points, hereinafter called I/F points, on the panels are machined to high precision during panel manufacturing with simple drill jigs. This saves tooling costs and assembly time and removes the need for liquid shimming.

A multi sided dispenser will inherently have stiff I/F points in the corners simplifying the interface towards a launch adapter.

Although the primary approach is to aim at a mass optimized carbon fiber sandwich design the concept works very well with a grid panel design providing significant cost savings at the expense of mass. As many constellation launches will be strictly volume driven due to satellite size, the extra mass may well be fully acceptable.

The use of a flat panel with full freedom to locate the I/F point anywhere on the plane, the design can be used both for the classical 4-bolted I/F used in most dispensers today, but also for mounting of a small clamp band system.

BRIEF DESCRIPTION OF DRAWINGS

The disclosure will be described in greater detail in the following, with reference to the attached drawings, in which FIG. 1 schematically shows a top view of a payload dispenser;

FIG. 5 schematically shows a front view of two panels attached to each other;

FIG. 6 schematically shows a front view of three panels attached to each other;

DESCRIPTION OF EXAMPLE EMBODIMENTS

Figure 2C:
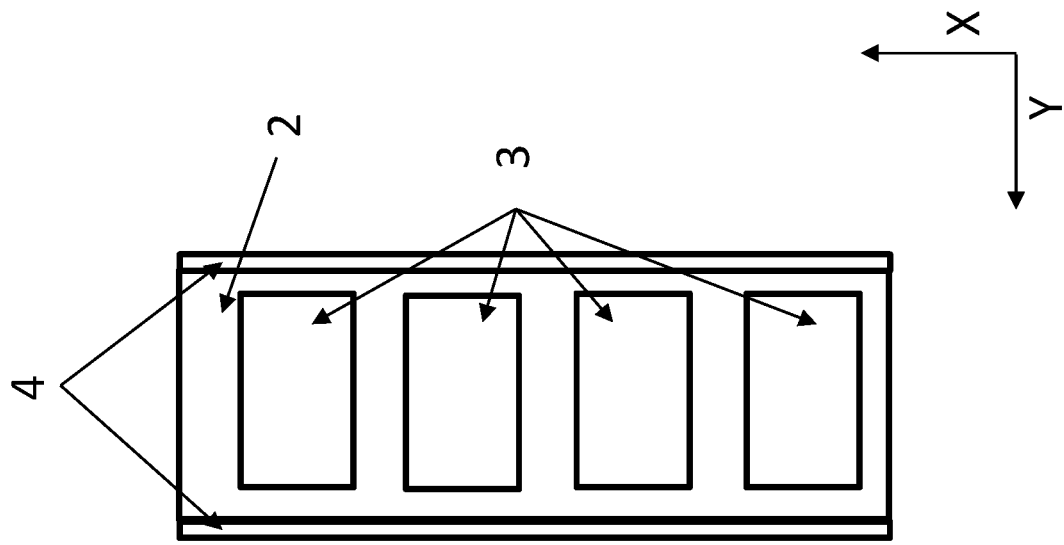
FIG. 2c schematically shows a front view of a panel and payloads.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

FIG. 1 schematically shows a top view of a payload dispenser 1 for a launch vehicle. The dispenser 1 comprises a panel 2 and a payload 3. The dispenser 1 comprises a plurality of panels 2 wherein at least one panel 2 comprises at least one payload 3 mounted onto the panel 2. FIG. 1 shows that the panels 2 are attachable to each other via attachment means 4 forming a self-supporting dispenser 1. FIG. 1 shows six panels 2 attached to each other. However, any plurality of panels 2 is possible but with a minimum of 3 panels in order to form a dispenser 1.

FIG. 1 shows that each panel 2 comprises at least one payload 3. According to another example shown in FIG. 6, one of the panels 2 in the dispenser 1 can be without any payload 3 while other panels 2 carry payload. Furthermore, as shown in FIGS. 2a-2b and 6, at least one panel 2 comprises a plurality of payloads 3.

According to one example, the payload 3 is a satellite.

In FIGS. 1-8, the payload dispenser 1 has an extension in a longitudinal direction X and in a radial direction R. Each panel 2 comprises attachment means in the longitudinal direction X being attachable to neighbouring panels 2.

The payload dispenser 1 is delimited in the radial direction R by the panels 2 forming an envelope surface and the panels 2 are attachable to each other in an interface running in the longitudinal direction X.

The attachment means 4 are arranged to lock in position with relation to each other to allow for the self-supporting dispenser 1.

The dispenser 1 is a primary load bearing structure that can carry one or more payloads. The payload can be arranged to be separated from the dispenser in a controlled manner via separation means. For this to happen, the payload dispenser comprises additional equipment connecting the separation means (not shown) to a control device (not shown). The control device is arranged to control the separation means to separate and eject the payload at a certain point in time and in a pre-determined direction.

FIG. 2a schematically shows a side view of a panel and payloads before assembly.

FIG. 2b schematically shows a side view of a panel and payloads after assembly. FIGS. 2a and 2b shows that the payload 3 is mounted onto the panel 2 before assembly of the dispenser 1.

Figure 2B:
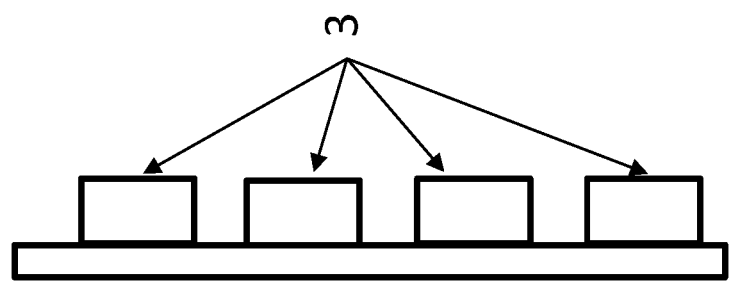
FIG. 2b schematically shows a side view of a panel and payloads after assembly.
Figure 2A:
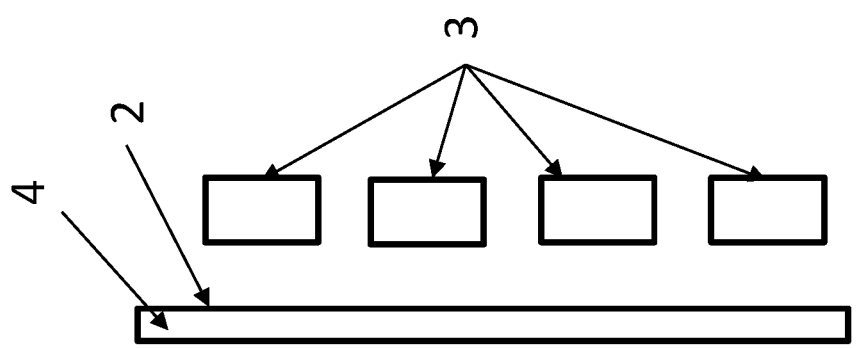
FIG. 2a schematically shows a side view of a panel and payloads before assembly.

FIG. 2c schematically shows a front view of a panel and payloads according to FIGS. 2a and 2b.

Figure 3:
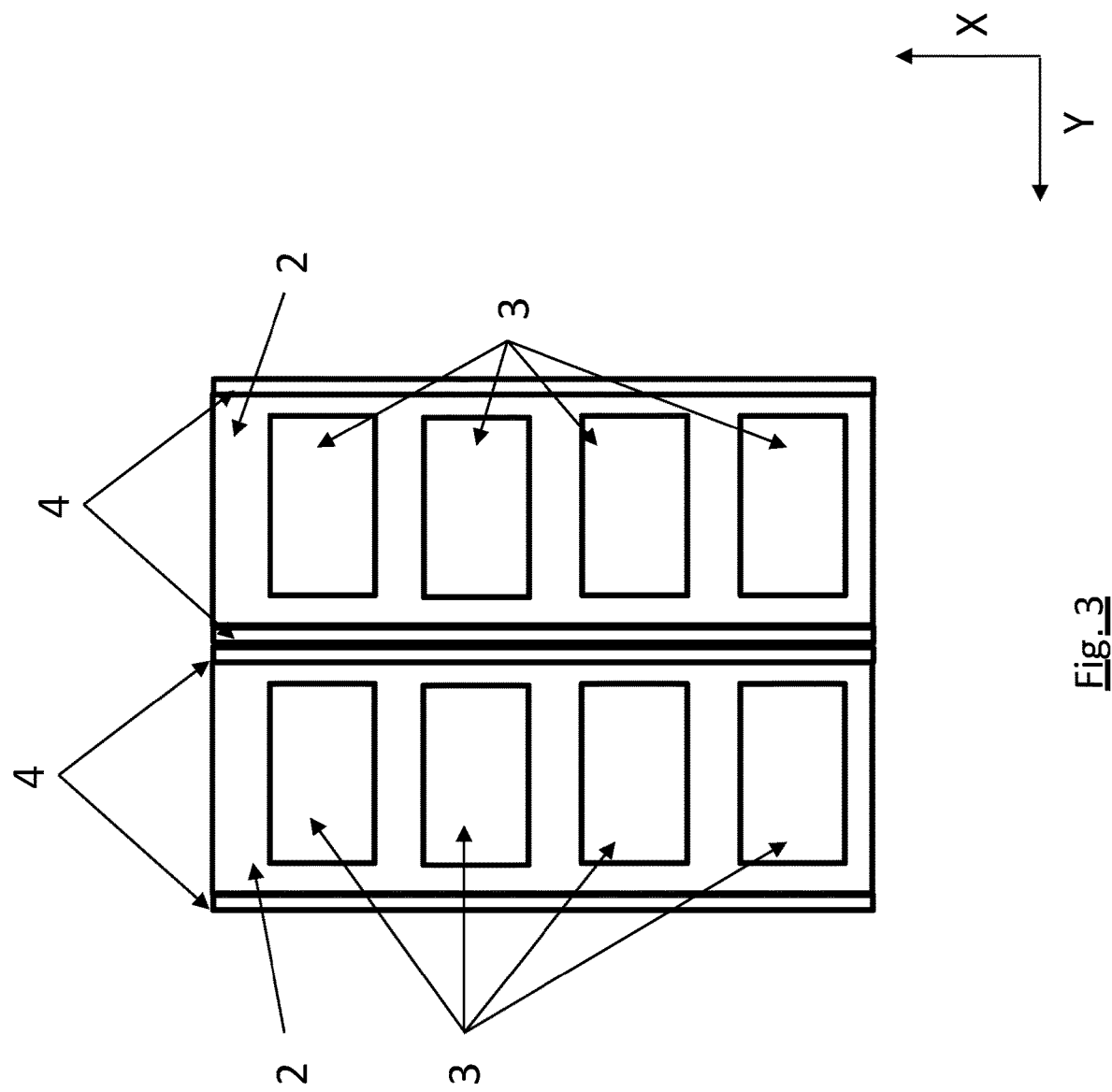
FIG. 3 schematically shows a front view of two panels attached to each other.

FIG. 3 schematically shows a front view of two panels attached to each other. FIG. 3 shows that the payload dispenser 1 is delimited in a lateral direction Y by the panels 2. In FIG. 3, each panel 2 has an unbroken extension in the longitudinal direction. However, as can be seen in FIG. 7, the panels 2 can be made from panel portions 5a, 5b.

Figure 4C:
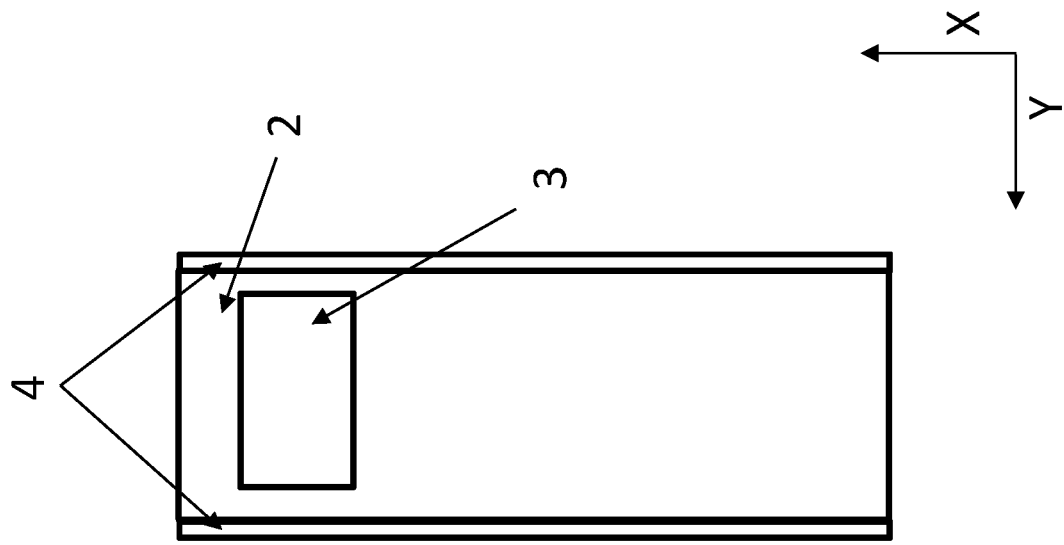
FIG. 4c schematically shows a front view of a panel and a payload.
Figure 4B:
FIG. 4b schematically shows a side view of a panel and a payload after assembly.
Figure 4A:
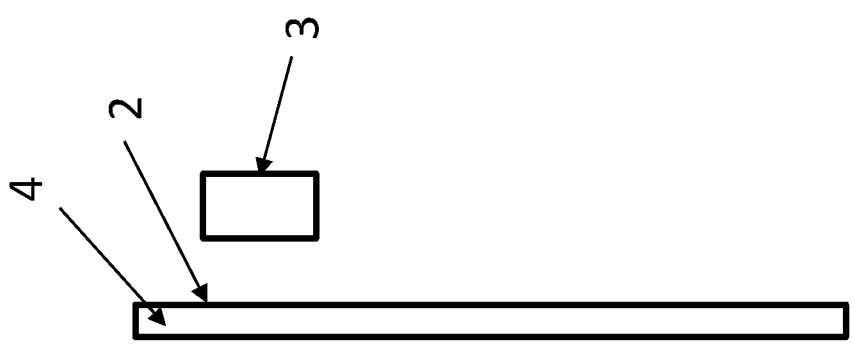
FIG. 4a schematically shows a side view of a panel and a payload before assembly.

FIG. 4a schematically shows a side view of a panel and a payload before assembly, FIG. 4b schematically shows a side view of a panel and a payload after assembly and FIG. 4c schematically shows a front view of a panel 2 and a payload 3. FIGS. 4a-4c shows the same as FIGS. 2a-2c but with the difference that only one payload 3 is mounted onto the panel 2.

FIG. 5 schematically shows a front view of two panels 2 attached to each other. One panel 2 is identical to what is shown in FIGS. 2a-2c and one panel is identical to what is shown in FIGS. 4a-4c. FIG. 5 thus only shows an example of that panels 2 with different amount of payloads can be combined. FIG. 6 schematically shows a front view of three panels 2 attached to each other, and in addition to the two panels 2 in FIG. 5, there is also a third panel attached to the other two without any payload to further broaden the example of the possibility to attach differently equipped panels to each other.

Figure 7:
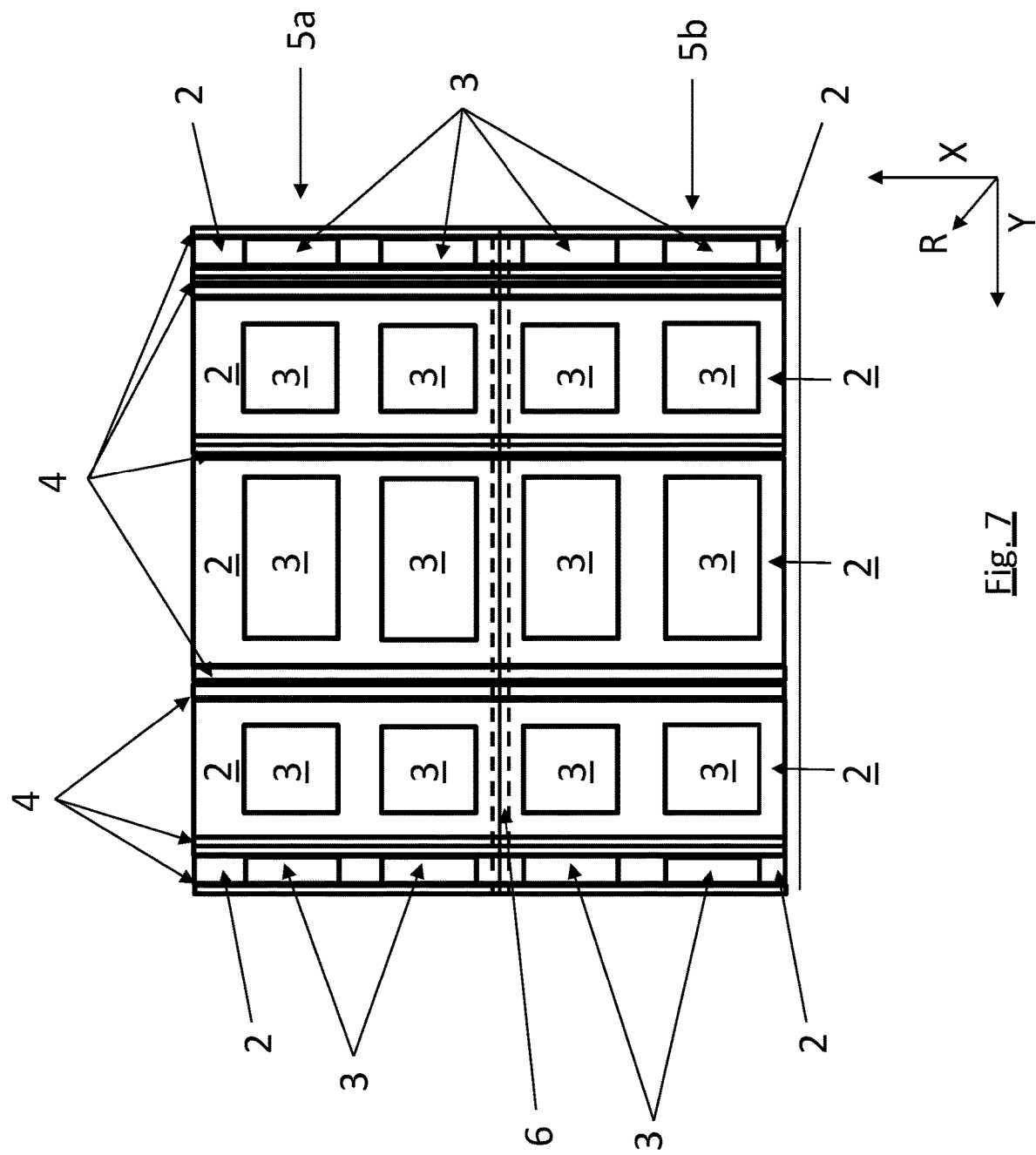
FIG. 7 schematically shows a side view of an assembled payload dispenser.

FIG. 7 schematically shows a side view of an assembled payload dispenser. FIG. 7 shows that at least one panel 2 comprises panel portions 5a, 5b attached to each other forming the panel 2. In FIG. 7 the panel portions 5a, 5b are connected to each other in the longitudinal direction X and in the lateral direction Y. The panels are attached to each other via the longitudinally extending attachment means 4 and the panel portions 5a, 5b are fixedly attached to each other along the laterally extending attachment means 6. The attachment means 4, 6 are positioned in the envelope surface of the dispenser, which means that the lateral extension refers to a direction perpendicular to the longitudinal direction but along the envelope surface. In FIG. 7 the dispenser is cylindrical, but different shapes are possible. However, common for all shapes are that the attachment means 4, 6 are positioned in the envelope surface of the dispenser 1. When the panels 2 are viewed separately as in FIGS. 2a-2c and 4a-4c, or attached to each other but in a flat state as in FIGS. 3, 5 and 6, then the lateral direction Y is perpendicular to the longitudinal direction as in Cartesian coordinates.

Figure 8:
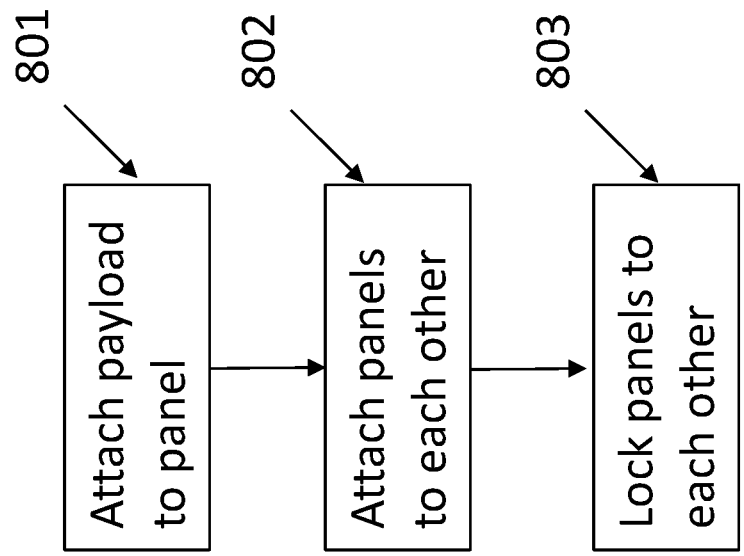
FIG. 8 schematically shows a flow chart of a method for assembly of the payload dispenser.

FIG. 8 schematically shows a flow chart of a method for assembly of the payload dispenser.

Box 801 relates to the step of mounting at least one payload 3 onto one panel 2. The step of mounting the at least one payload 3 onto one panel is advantageously done before assembly of the panels 2.

Box 802 relates to the step of attaching the panels 2 to each other via longitudinally extending attachment means 4.

Box 803 relates to the step of locking the attachment means 4 in position to hinder movement between the panels 2 forming a self-supporting dispenser 1.

As described above, the panels 2 can be made from panel portions 5a, 5b and the panel portions are connected to each other via laterally extending attachment means 6. The panels 2 are attached to each other via the longitudinally extending attachment means 4. The method steps in connection to Boxes 802 and 803 can then be described as follows:

Box 802 relates to the step of attaching the panels 2 to each other via longitudinally extending attachment means 4. According to one example, the panel portions 5a, 5b are attached to each other via the laterally extending attachment means 6 before the panels 2 are attached to each other via the longitudinally extending attachment means 4. According to another example, panel portions 5a, 5b are attached to each other via the longitudinally extending attachment means 4 forming dispenser portions and the panel portions, i.e. the panel portions 5a, 5b are then attached to each other via the laterally extending attachment means 6. In the latter example the dispenser can be built in sections where the dispenser portions are positioned on top of each other in the height direction, i.e. the longitudinal direction.

Box 803 relates to the step of locking the attachment means 4, 6 in position to hinder movement between the panels 2 forming the self-supporting dispenser 1.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS 1. payload dispenser
2. panel
3. payload
4. longitudinal attachment means
5a and 5b. panel portions
6. lateral attachment means

The invention claimed is:

1. A self-supporting payload dispenser for a launch vehicle, comprising:
 a first panel;
 a second panel;
 a third panel with a-payload mounted onto the third panel, wherein the payload comprises a satellite, wherein the first panel, the second panel, and the third panel are attachable to each other forming a self-supporting payload dispenser, wherein the self-supporting dispenser is a primary load bearing structure arranged to transfer loads from a launch vehicle to the payload, and is designed as a facetted tube with detachable sides.

2. The payload dispenser according to claim 1, wherein the first panel comprises a second payload and the second panel comprises a third payload.

3. The payload dispenser according to claim 1, wherein the first panel is free from any payload.

4. The payload dispenser according to claim 1, wherein the payload dispenser extends in a longitudinal direction (X) and in a radial direction (R), wherein the first panel comprises a first attachment in the longitudinal direction (X) and the second panel comprises a second attachment in the longitudinal direction (X) which is attachable to the first attachment so that the first panel is attached to the second panel.

5. The payload dispenser according to claim 4, wherein the first attachment and the second attachment are arranged to lock in position with relation to each other.

6. The payload dispenser according to claim 1, wherein the payload dispenser extends in a longitudinal direction (X) and in a radial direction (R), and the payload dispenser is delimited in the radial direction (R) by the first panel, the second panel, and the third panel forming an envelope surface, wherein the first panel, the second panel, and the third panel are attachable to each other in an interface running in the longitudinal direction (X).

7. The payload dispenser according to claim 1, wherein the payload dispenser is delimited in a lateral (Y) direction by the first panel, the second panel, and the third panel, wherein each of the first panel, the second panel, and the third panel extends in an unbroken manner in a longitudinal direction (X).

8. The payload dispenser according to claim 1, wherein the first panel comprises panel portions attached to each other forming the first panel.

9. The payload dispenser according to claim 8, wherein the panel portions are connected to each other in a longitudinal direction (X) and/or a lateral direction (Y).

10. The payload dispenser according to claim 9, wherein the panel portions are fixedly attached to each other along laterally extending attachments.

11. The payload dispenser according to claim 1, wherein the third panel comprises panel portions attached to each other forming the third panel.

12. The payload dispenser according to claim 11, wherein the panel portions are connected to each other in a longitudinal direction (X) and/or a lateral direction (Y).

13. A method for assembly of a payload dispenser comprising:
 a first panel;
 a second panel;
 a third panel with a payload mounted onto the third panel, wherein the payload comprises a satellite, and wherein the first panel, the second panel, and the third panel are attachable to each other forming a self-supporting payload dispenser, wherein the self-supporting dispenser is a primary load bearing structure arranged to transfer loads from a launch vehicle to the payload, and is designed as a facetted tube with detachable sides;
 wherein the method of assembly comprises:
  mounting a payload onto the third panel;
  attaching the first panel and the second panel to each other via a first longitudinally extending attachment and a second longitudinally extending attachment;
  locking the first attachment and the second attachment in position to hinder movement between the first panel and the second panel forming a self-supporting payload dispenser.

14. The method according to claim 13, further comprising:
  mounting a second payload onto the first panel before assembly of the first panel, the second panel, and the third panel; and
  mounting a third payload onto the second panel before assembly of the first panel, the second panel, and the third panel.

* * * * *